United States Patent Office 3,529,042
Patented Sept. 15, 1970

3,529,042
METHOD FOR MANUFACTURING CAST SOLID POLYURETHANE PROPELLANTS
Ralph C. Lippert, Bartlesville, Okla., assignor to Phillips Petroleum Company, a corporation of Delaware
No Drawing. Filed Oct. 22, 1959, Ser. No. 848,161
Int. Cl. C06b 21/00
U.S. Cl. 264—3        17 Claims This invention relates to cast solid propellants. In one aspect this invention relates to cast solid propellants which are uniformly free of entrained gases, bubbles and/or voids. In another aspect this invention relates to cast solid propellants having improved physical properties.

In recent years great interest has developed in solid propellants for jet propulsion devices, such as missiles, rocket motors, gas generators, and the like. One type of solid propellant which has received particular attention is that of the composite type. A typical composite propellant comprises a finely divided inorganic oxidizer material such as ammonium perchlorate, bonded together by a suitable binder component to form a solid mass. The oxidizer furnishes oxygen required for the combustion of the binder component, the latter being sometimes referred to as the fuel-binder. These propellants can also contain various other compounding ingredients, such as a burning rate catalyst which is used in controlling the rate at which the propellant is burned or consumed during operation.

One of the most important solid propellant parameters is the burning rate of the propellant. The basic solid propellant burning equation for restricted solid propellants, such as the type with which this invention is concerned, is expressed as:

$$r = k(p_c)^n$$

where $r$ is the burning rate in inches per second; $p_c$ is the combustion chamber pressure in pounds per square inch; $k$ is a constant which varies with the ambient grain temperature; and $n$ is a constant known as the burning rate exponent.

Inspection of the above burning equation reveals that the sensitivity of the burning rate of the solid propellant to pressure is represented by the burning rate exponent $n$. For stable and practical operation, $n$ should lie between 0 and 1, and preferably should be as low as possible since as $n$ approaches 1 the burning rate is very sensitive to changes in combustion chamber pressure, and vice versa. The importance of the burning rate cannot be overestimated since the velocity at which a solid propellant is consumed during operation is determined to a great extent by the burning rate; where high thrusts are required in relatively short periods of time, solid propellants having fast burning rates are utilized. With the availability of solid propellant compositions having controllable burning rates which are relatively fast and insensitive to combustion chamber pressure, the fabricator of solid propellants has greater latitude in choosing the desired propellant grain design or charge geometry.

Another important parameter of a propellant system is specific impulse, $I_{sp}$, which is the amount of thrust in pounds that can be obtained per pound of propellant consumed per second. This property has a direct bearing on the over-all efficiency of a propellant system. A high value of $I_{sp}$ is desirable and a small increase in specific impulse can result in an appreciable improvement in range.

In addition to burning and specific impulse characteristics, the propellant must have certain physical properties, among the most important of which are elongation and tensile strength. These properties must be such as to enable the grain of propellant to withstand storage and handling conditions prior to firing and withtsand loads to which the propellant is subjected during actual firing and burning. Typical of conditions to which the grain is subjected is that of varying temperatures which cause the propellant and metal case of the rocket motor to expand and contract at different rates. Such expansion and contraction must be permitted to occur without the development of cracks or other imperfections in the mass of propellant which would lead to changes in exposed burning surface and uncontrolled burning. Because of the quick change in pressure exerted on the grain of propellant upon firing, the propellant must also have such properties as to be able to withstand such changes in pressure which tend to change the dimension and shape of the propellant grain.

It is essential that composite type propellant compositions be free of all physical discontinuities such as cracks, voids, and bubbles caused by entrained gases, because said discontinuities are extremely detrimental to the combustion characteristics of the propellant grain. When such discontinuities are present they often result in such increases in available burning surface that essentially uncontrolled burning occurs which results in such great increases in pressure that the rocket motor containing the propellant charge sometimes explodes. Great care is taken during fabrication of propellants to avoid said discontinuities. Elaborate evacuation techniques are frequently employed so as to insure the complete removal of entrained gases.

In recent years emphasis has been placed upon the use of flexible binder materials so as to avoid problems associated with the storing, handling, and firing of solid propellants. Interest has also increased in the use of castable binder materials from which castable propellant compositions can be cast into suitable molds. The well known class of rubbery materials known as polyurethanes has been proposed for this use. Said polyurethanes can be prepared as a castable liquid, the remainder of the propellant ingredients incorporated therein, the resulting castable composition cast into a suitable mold, and then cured. In general, said polyurethanes are satisfactory binder materials for cast propellant compositions and solve many of the problems set forth above. However, said polyurethanes are peculiarly susceptible to the formation of discontinuities as described above, particularly bubble formation due to entrained gases. Even though great care, such as the use of elaborate evacuation techniques, is taken during mixing of the propellant composition, and the mix is apparently free of bubbles at the end of the mixing steps, it has been found that bubbles are very frequently present in the final cured propellant. When this occurs, the propellant grain must be discarded because of the danger of uncontrolled burning due to increase of surface as described above.

I have found that these bubbles, which are not present at the end of the mixing period, but which are present after the propellant grain has been finally cured, are due to the presence in the polyurethane of unstable gas forming impurities which decompose during the curing step to form gases which are entrained as bubbles in the cured propellant. Since the propellant composition is cured after it has been poured into the final mold, it is then too late to remove said bubbles. For example, water is an impurity which is frequently present in some of the polyurethane monomers or some of the other propellant composition ingredients. Said water will react with the diisocyanate monomers according to the equation

with the liberation of carbon dioxide as indicated.

I have further found that castable composite type propellant compositions comprising a liquid castable polyurethane can be cast and cured to solid propellant compositions which are free of discontinuities, such as bubbles and/or entrained gases, by mixing the ingredients of said propellant composition under vacuum, and during said mixing step heating the mixture for a short period of time to a temperature slightly above the temperature at which said composition is to be subsequently cured. Thus, broadly speaking, the present nivention resides in the improvement comprising heating said propellant composition for a short period of time during the mixing thereof to a temperature slightly above the temperature at which it is to be subsequently cured.

An object of this invention is to provide an improved solid propellant grain. Another object of this invention is to provide an improved castable propellant composition. Still another object of this invention is to provide a method for preparing improved cast propellant grains from castable propellant compositions. Another object of this invention is to provide a method for producing a cast grain of propellant material which is free of bubbles and/or entrained gas. Still another object of this invention is to provide a cast propellant grain which is free of bubbles and/or entrained gases and is thus not subject to uncontrolled burning. Other aspects, objects and advantages of the invention will be apparent to those skilled in the art in view of this disclosure.

Thus, according to the invention, there is provided a method for preparing a castable propellant composition comprising, in combination, the steps of: blending, under vacuum, a solid inorganic oxidizing salt into a curable liquid polyurethane for a period of time sufficient to form a homogeneous mixture, i.e., a uniform dispersion of said oxidizing salt in said polyurethane; and during said blending step, heating said mixture to a temperature slightly above the temperature at which said composition is to be subsequently cured, said heating being carried out for a period of time sufficient to decompose unstable gas forming impurities present in said polyurethane but insufficient to obtain appreciable cure of said polyurethane.

Composite type propellants comprising a polyurethane binder component are usually cured at temperatures ranging from about 150° to 200° F.; however, any suitable curing temperature can be employed. In the practice of the invention, after the curing temperature has been selected, the propellant composition mixture is heated during the final mixing step to a temperature slightly above said curing temperature. The temperature to which said mixture is thus heated can be from 5 to 25, usually 10 to 15° above said curing temperature. It is important that the time said propellant mixture is maintained at said elevated temperature above said curing temperature be sufficient to decompose unstable gas forming impurities in the polyurethane but insufficient to obtain appreciable cure of said polyurethane. Usually this period of time will range from about 5 to about 25 minutes, preferably about 5 to about 15 minutes.

Polyurethanes are well known materials which are prepared by the interaction of one or more active hydrogen containing compounds containing at least one active hydrogen atom with a polyisocyanate. In preparing the polyurethane to form a curable fluid blend, said monomers are blended together and said fluid blend is cured to form a solid product. Said active hydrogen containing compound can be any suitable such compound containing at least one, but preferably at least two, reactive hydrogen containing groups in the molecule. Any suitable organic polyisocyanate can be used in the practice of the invention; however, diisocyanates are preferred because of their availability and ease of preparation. Both the active hydrogen containing compound and the diisocyanate should be liquid under the conditions of use. Said polyurethane monomers are usually reacted in substantially stoichiometric amounts (based on the active hydrogen functionality of the active hydrogen containing monomer). However, said active hydrogen containing monomer can be used in amounts up to about 15 weight percent in excess of stoichiometric and said polyisocyanate can be used in amounts up to about 25 weight percent in excess of stoichiometric.

Representative polyisocyanates which can be used in the practice of the invention include, among others, the following: benzene - 1,3 - diisocyanate, benzene-1,4-diisocyanate, hexamethylene diisocyanate, toluene - 2,4 - diisocyanate, toluene - 2,5 - diisocyanate, diphenylmethane-4,4'-diisocyanate, diphenyl - 4,4' - diisocyanate, diphenyl-3,3'-dimethyl - 4,4'-diisocyanate, 2-chloropropane-1,3-diisocyanate, diphenyl - 3,3' - dimethoxy-4,4'-diisocyanate, naphthalene - 1,5 - diisocyanate, pentamethylene diisocyanate, tetramethylenediisocyanate, octamethylene diisocyanate, dimethylene diisocyanate, propylene - 1,2 - diisocyanate, benzene - 1,2,4 - triisocyanate, toluene - 2,3-diisocyanate, diphenyl - 2,2' - diisocyanate, naphthalene-2,7-diisocyanate, naphthalene - 1,8 - diisocyanate, toluene-2,4,6 - triisocyanate, benzene-1,3,5-triisocyanate, benzene-1,2,3-triisocyanate, and toluene-2,3,4-triisocyanate.

Active hydrogen containing compounds which can be used in the practice of the invention include those which have plasticizing properties and which are known to react with polyisocyanates to form polyurethanes. Compounds which are useful for this purpose in the practice of the invention are those which contain hydroxyl and/or amino groups, each of said amino groups containing at least one active hydrogen atom, and which are reactive with an isocyanate group, —NCO. Compounds employed preferably have two or more of said reactive hydrogen containing groups in the molecule. Commonly, the preferred compounds are glycols and hydroxy containing esters, including polyglycols and polyesters. Polyamino compounds including diamines such as putrescine and cadaverine can also be employed. Triols such as glycerol and tetrols such as erythritol can also be used. Natural products which are particularly useful include castor oil, which comprises a glyceride of ricinoleic acid, and ricinoleyl alcohol, and mixtures thereof. Said active hydrogen containing compounds should be liquid under the conditions of use defined above.

Other examples of these active hydrogen containing compounds include alkylene glycols such as ethylene glycol, diethylene glycol, tetraethylene glycol, neopentyl glycol, compounds designated as polyethylene glycol and polypropylene glycol having a molecular weight as high as 10,000 and even higher, propylene glycol, dipropylene glycol, mixed glycols such as the ethylene-propylene glycols, butylene glycol, dibutylene glycol, pentamethylene glycol, ricinoleyl acohol, pentaerythritol [2,2-bis(hydroxymethylene)-1,3-propanediol], esters containing two or more OH groups, and the like. The esters can be made by reaction of dicarboxylic acids with glycols. Acids which can be used in the preparation of these esters include adipic, sebacic, succinic, phthalic and ricinoleic. These acids can be reacted with the above-described glycols to give esters of relatively low (e.g., 200–500) to relatively high (10,000 and even higher) molecular weight. Various methods for the preparation of these esters are known. For example, the acid and glycol can be reacted at an acid to glycol mol ratio between 0.5 and 2 under conditions to promote elimination of the water produced by the reaction. Still another method involves alternate additions of dicarboxylic acid and of glycol.

Still other examples of the active hydrogen containing compounds are ethanolamine, diethanolamine, isopropanolamine, diisopropanolamine, ethanolisopropanolamine, dibutanolamine, ethanolbutanolamine, ethylenediamine, diethylenetriamine, triethylenetetramine, tetraethylenepentamine, propylenediamine, dipropylene triamine, hexamethylenediamine, heptamethylenediamine, 2,3-dimethyl-1,6-diaminohexane, 4,6-diethyl - 1,5,8 - triaminooctane, 3,9-dimethyl - 4,8 - diisobutyl - 1,6,11 - triaminoundecane, 1,5-diamino - 2 - pentene, 1,6-dimethyl-1,7-diamino-4-heptene, and 2,8,7-trimethyl-1,6,10-triamino-3-decene.

Still another group of active hydrogen containing compounds which can be used in the practice of the invention are the polyol copolymers of two or more mixed cyclic ethers. The cyclic ethers (epoxy compounds) which are useful in preparing said polyol copolymers can be defined by the following structural formula:

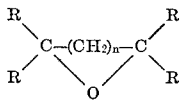

where $n$ is an integer from 0 to 3, and R is a radical selected from the group consisting of hydrogen, alkyl, alkenyl, alkynyl, aromatic, alkaryl aralkyl, cycloalkyl, alkylcycloalkyl, and halogen substituted groups thereof, the total number of carbon atoms in said compound not exceed 36.

Representative copolymerizable cyclic ethers (named according to the epoxy nomenclature) include: epoxyethane (ethylene oxide), 1 - phenylepoxyethane, 1 - cyclohexyl - 2 - (4 - chlorocyclohexyl) - epoxyethane, 1,2-diphenylepoxyethane, 1,2 - diphenyl - 1 - chloroepoxyethane, 1 - cyclohexyl - 2,3 - epoxypropane, 1,2 - epoxypropane, 1,3 - epoxypropane, 1,2 - epoxy - 2 - methylpropane, 3 - chloro - 1,2 - epoxypropane, 3 - bromo - 1,2-epoxypropane, 2 - methyl - 1,2 - epoxypropane, 3 - phenyl-1,2 - epoxypropane, 3 - cyclohexyl - 1,3 - epoxypropane, 3 - bromo - 1,3 - epoxypropane, 1 - phenyl - 3 - (3-methylphenyl) - 1,2 - epoxypropane, 1 - (3 - chlorocylohexyl) - 3 - cyclopentyl - 1,2 - epoxypropane, 1,2 - epoxybutane, 2,3 - epoxybutane, 1,3 - epoxybutane, 1,4 - epoxybutane, 3,4 - dichloro - 1,2 - epoxybutane, 3 - methyl-1,2 - epoxybutane, 2,3 - dimethyl - 2,3 - epoxybutane, 3-(3 - methylphenyl) - 1,2 - epoxybutane, 1 - phenyl - 4-(3 - chlorophenyl) - 1,2 - epoxybutane, 1 - (3 - ethylcyclohexyl) - 4 - cyclopentyl - 1,2 - epoxybutane, 1,2 - epoxypentane, 1,3 - epoxypentane, 1,4 - epoxypentane, 2,3-epoxyhexane, 1,2 - epoxyheptane, 3,4 - epoxydecane, 1,2 - epoxydodecane, 5,6 - epoxytricane, 1,2 - epoxypentadecane, 1,3 - epoxyoctadecane, 1,3 - epoxyeicosane, 1,2 - epoxypentacosane, 1,3 - epoxytriacontane, 1,2 - epoxydotriacontane, 1,3 - epoxyhexatriacontane, 1,2 - epoxypropane, 1,2 - epoxy - 3 - butene, 1,2 - epoxy - 3,5 - hexadiene, 5 - methyl - 6 - phenyl - 3,4 - epoxy - 1,5 - hexadiene, 1,2 - epoxy - 3 - butyne, 2,3 - epoxy - 4 - pentyne, 3,4-epoxy-1-heptene-6-yne, and the like.

The epoxy compounds preferred in preparing the polyol polymers are the vic-epoxy compounds containing 2 to 4 carbon atoms, such as epoxyethane, 1,2-epoxypropane, and 1,2-epoxy-3-methylpropane.

The polymerization of two or lore of these mixed cyclic ethers to form the polyol polymers having high molecular weights (e.g., 500 to 10,000) is known in the art and for purposes of brevity their polymerization will not be set forth in detail herein. The preferred polyol polymers used in the practice of this invention are polydiol mixed polymers of epoxyethane (ethylene oxide) and 1,2-epoxypropane (1,2-propylene oxide), sometimes referred to as mixed polyoxypropylene-polyoxyethylene polymers. Commercially available polyol polymers of this type include: Pluronics designated L44, L61, L62, L64, and F68, which have the general formula

and NIAX polyols designated Diol 50–HEG, Diol 25–HEG, and Diol 10–HEG. These Pluronic polyol polymers are block polymers whereas the NIAX polymers are random polymers.

When said polymers of mixed cyclic ethers are used as the active hydrogen containing compound in forming a polyurethane, it is desirable to employ a small amount of another polyhydroxy compound as a cross-linking agent. It is preferred that said cross-linking agent have three or more hydroxy groups. Many of the above-named polyhydroxy compounds are in this preferred group of cross-linking agents. For example, representative polyhydroxy cross-linking agents include, among others, the following: saturated aliphatic and aromatic polyhydric alcohols, such as 1,2,3-propanetriol (glycerol), 1,2,6-hexanetriol, trimethylolpropane, erythritol, pentaerythritol, ribitol, xylitol, sorbitol, mannitol, trimethylolphenol, trimethylolbenzene, and the like; polyhydric amines, such as trimethylolamine, triethanolamine, triisopropanolamine, tri-n-propanolamine, N,N,N′,N′ - tetrakis(2 - hydroxypropyl) ethylene diamine (Quadrol), N(2 - hydroxyethyl) - N,N′,N′ - tris(2 - hydroxypropyl) ethylene diamine, and the like; esters of polyhydric alcohols and fatty acids, such as castor oil, glyceryl mono-, di-, and triricinoleate, glyceryl mono, di-, and tri(12-hydroxystearate), pentaerythritol mono-, di-, tri-, and tetraricinoleate, pentaerythritol mono-, di-, tri-, and tetra(12 - hydroxystearate), 2,3 - dihydroxypropyl-12 - hydroxystearate, 2,3 - dihydroxy ricinoleate, and the like; alkylene oxide adducts of polyhydric alcohols, such as ethylene oxide adducts of glycerol, 1,2,6-hexanetriol, and pentaerylthritol, propylene oxide adducts of glycerol (NIAX Triol LG Series), propylene oxide adducts of 1,2,6-hexanetriol (NIAX Triol LHT Series), and the like; condensation products of two or more polyhydric alcohols, such as condensation products of 1,2,6-hexanetriol and glycerol; and the like; polyhydric derivatives of sugars, such as the octakis(2-hydroxypropyl) derivative of sucrose (Hyprose SP80), and like derivatives of glycose; and the like.

The amount of said polyhydroxy cross-linking agent used in the practice of the invention will be minor, generally between 0.01 to 15 weight percent of the total propellant composition, preferably 0.25 to 5 weight percent. When said polyhydroxy cross-linking agents are used, the amount of polyisocyanate monomers used is based on the total active hydrogen functionality of both the polyol polymers and the polyhydroxy cross-linking agent.

The above-described polyurethanes comprise the principal ingredient of the binder component of the propellant compositions of the invention. In addition to said polyurethane there may be present in said binder component one or more other compounding ingredients such as plasticizers, wetting agents, antioxidants, reinforcing agents, and curing catalysts. The finished binder frequently contains various compounding ingredients. Thus, it will be understood that herein and in the claims, unless otherwise specified, the term "binder" is employed generically and includes various conventional compounding ingredients. The binder content of the total propellant composition will usually range from about 5 to about 40 weight percent of the total propellant composition.

In general, any rubber plasticizer which is compatable with the above-described polyurethanes can be employed. Materials such as the various N-vinyl amides, dioctyl sebacate, di(1,4,7 - trioxaundecyl)methane, di(3,6 - dioxadecyl)formal (TP–90B), and dioctyl phthalate are suitable plasticizers. Materials which provide a rubber having good low temperature properties are preferred.

Wetting agents aid in deflocculating or dispersing the oxidizer, Aerosol OT (dioctyl ester of sodium sulfosuccinic acid), lecithin, and Duomeen C diacetate (the diacetate of trimethylene diamine substituted by a coconut oil product) are among the materials which are applicable.

Antioxidants include Flexamine (physical mixture containing 65 percent of a complex diarylamine-ketone reaction product and 35 percent of N,N′-diphenyl-p-phenylenediamine), phenyl - beta - naphthylamine, 2,2 - methylene - bis(4 - methyl - 6 - tert - butylphenol), and the like. Rubber antioxidants, in general, can be employed or if desired can be omitted.

It is sometimes desirable to use curing catalysts so as to alter the curing time and the properties of the finished propellant.

Suitable curing catalysts include among others, metal complexes such as Ferrocene (dicyclopentadienyl iron) or 2,4-pentane-dione complexes with cobalt, chromium, nickel or iron. The amount of curing catalyst used will generally range from 0 to 1 weight percent based on the total propellant composition.

The curing temperature will be limited by the oxidant employed in some cases but will generally be in the range between 150 and 250° F., preferably between 150 and 200° F. The curing time must be long enough to give the required creep resistance and other mechanical properties in the propellant. The time will generally range from around 2 or 3 hours when the higher curing temperatures are employed to about 2 to 4 days when the lower curing temperatures are employed.

It is preferred that the oxidant component used in the propellant compositions of the invention have a low moisture content, preferably in the range of $<0.01$ to 0.1 weight percent.

Oxidants which are applicable in the solid propellant compositions of this invention are those oxygen containing solids which readily give up oxygen and include, for example, ammonium, alkali metal, and alkaline earth metal salts of nitric, perchloric, and chloric acids, and mixtures thereof. Ammonium nitrate and ammonium perchlorate are the preferred oxidizers for use in the solid propellants of this invention. Other specific oxidizers include sodium nitrate, potassium perchlorate, lithium chlorate, calcium nitrate, barium perchlorate, and strontium chlorate. Mixtures of oxidizers are also applicable. In the preparation of the solid rocket propellant compositions, the oxidizers are ground to a partcile size, preferably within the range between 2 and 300 microns average particle size. The most preferred size is from 10–220 microns. The amount of solid oxidizer used is usually a major amount of the total propellant composition and is generally in the range between 60 and 95 percent by weight of the total propellant composition.

Burning rate catalysts applicable in the invention include ammonium dichromate, and metal ferrocyanides and ferricyanides. Ferric ferrocyanides, such as Prussian, Berlin, Hamburg, Chinese, Paris, and Milori blue, soluble ferric ferrocyanide, such as soluble Berlin or Prussian blue which contains potassium ferric ferrocyanide, and ferric ferrocyanide which has been treated with ammonia, are among the materials which can be used. Ferrous ferricyanide, Turnbull's blue is also applicable. A particularly effective burning rate catalyst is Milori blue which is a pigment similar to Prussian blue but having a red tint and is prepared by the oxidation of paste of potassium ferrocyanate and ferrous sulfate. Other metal compounds such as nickel and copper ferrocyanides can also be employed. The amount of burning rate catalyst used, in the propellant compositions of this invention, is usually in the range of 1 to 10 weight percent based on the total propellant composition.

It is to be understood that each of the various types of compounding ingredients can be used singly, or mixtures of various ingredients performing a certain function can be employed. It is sometimes preferred, for example, to use mixtures of plasticizers rather than a single material.

The binder forms a continuous phase in the propellant with the oxidant as the discontinuous phase. One procedure for blending the propellant ingredients utilizes a stepwise addition of oxidant and other dry ingredients to the binder mixture. The binder ingredients are mixed to form a binder mixture, and the oxidizer ingredient is then added to said binder mixture in equal subsequent additions, usually four or more.

One presently preferred and convenient method of preparing the castable propellant compositions of the invention comprises blending a solid inorganic oxidizing salt with an N-vinyl amide or other plasticizer so as to coat said salt with said plasticizer and form a first blend. Other solid ingredients such as the burning rate catalyst can be blended in with the oxidizer if desired. Said first blend is then blended with an active hydrogen-containing compound and the remainder of the ingredients (except the polyisocyanates) to form a second blend. Said second blend is then blended with a polyisocyanate in an amount sufficient to interact with said active hydrogen containing compound and form a polyurethane. Other variations in the mixing procedure can be introduced. In some instances all of the ingredients except the polyisocyanate can be blended in one operation and the polyisocyanate is then added. It is even possible with some polyisocyanates to incorporate them with the rest of the ingredients rather than waiting until all of the other ingredients are thoroughly blended.

If desired a highly halogenated organic compound such as Kel-F Polymer Oil (polytrifluorochloroethylene) can be employed as a casting aid in the propellant compositions.

The final mixing step is performed under vacuum and during this step the temperature of the mix is increased to a few degrees above the temperature at which the propellant mix is to be subsequently cured and is maintained at this elevated temperature for a short period of time as described above. During this period of time any unstable gas forming impurities will be decomposed to gaseous products and will be removed. In the absence of this heat treatment said gaseous products are evolved during the curing step and are distributed throughout the final propellant composition as bubbles as described above.

A general formulation for a propellant composition prepared in accordance with the invention is as follows:

| | Weight percent |
|---|---|
| Binder | 5–40 |
|     Polyurethane | 5–40 |
|     Plasticizer | 0–15 |
|     Antioxidant | 0–5 |
|     Surface active agent | 0–5 |
|     Curing catalyst | 0–1 |
|     Highly halogenated organic compound | 0–5 |
| Oxidizer | 60–95 |
| Burning rate catalyst | 0–10 |

The following examples will serve to further illustrate the invention.

EXAMPLE I

The following propellant composition was prepared:

| | Weight percent |
|---|---|
| Pluronic L–61 [1] | 16.22 |
| Quadrol [2] | 0.94 |
| Hylene T [3] | 2.84 |
| Ammonium perchlorate | 80.00 |

[1] A liquid mixed polyoxypropylene-polyoxyethylene copolymer having a molecular weight of 1500 to 1800 and having 10 percent polyoxyethylene in the total molecule.
[2] Tetrakis (beta-hydrovypropyl)ethylene diamine.
[3] Toluene-2,4-diisocyanate.

The binder materials, that is, the diol, the Quadrol and the diisocyanate, were mixed first and the ammonium perchlorate then added increment-wise. The whole composition was then thoroughly mixed at room temperature for twenty minutes, then cast into a suitable mold and vibrated for 30 minutes. Both the mixing and vibrating steps were carried out under vacuum. During the mixing step the temperature of the mix was increased to 170° F., and maintained at this temperature for about 5 minutes. After the casting and vibrating step, the composition was cured for 72 hours at 160° F. The cured and finished propellant was entirely free from voids.

EXAMPLE II

When the above preparation was repeated, except that all steps up to the curing step were carried out at room temperature, the final propellant composition contained numerous (approximately 1200 per cubic inch) gas bubbles which were about one-half to one millimeter in diameter.

EXAMPLE III

Another propellant composition was prepared and contained the following ingredients:

were prepared and the burning rates were determined according to the Crawford bomb technique. Propellant D was cast into a sleeve measuring 5 inches in length and 3 inches in diameter, using a 1½ inch diameter axial mandrel. The cured cast sleeve was inserted in a rocket motor and burned to determine ballistic properties. Results of said tests are given in Table II below.

TABLE II

| Propellant | Ingredients | Wt. percent | Ballistic properties [1] | | | | | |
|---|---|---|---|---|---|---|---|---|
| | | | Strand data | | Motor data [2] | | | |
| | | | $r$ | $n$ | $r$ | $n$ | $I_{sp}$ | $C^*$ |
| C | Pluronic L-61 [3] | 14.36 | 0.190 (@ 600 p.s.i.) | 0.38 (@ 300–1,250 p.s.i.) | | | | |
| | Castor oil | 3.26 | | | | | | |
| | Toluene diisocyanate | 2.38 | 0.230 (@ 100 p.s.i.) | | | | | |
| | Ammonium perchlorate | 80.00 | | | | | | |
| D | Pluronic L-61 [3] | 14.36 | 0.246 (@ 600%, 1,000 p.s.i.) | 0.00 (@ 300–1,000 p.s.i.) | 0.264 | [4] 230 | | 4,348 |
| | Castor oil | 3.26 | | | | | | |
| | Toluene diisocyanate | 2.38 | | | | | | |
| | Powdered aluminum (6 micron flake) | 5.00 | | | | | | |
| | Ammonium perchlorate | 75.00 | | | | | | |

[1] $r$=burning rate, in./sec., $n$=pressure exponent, $I_{sp}$=specific impulse, lb.-sec./lb., $C^*$=characteristic exhaust velocity, ft./sec.
[2] At 1,000 p.s.i.
[3] A liquid mixed polyoxypropylene-polyoxyethylene polymer having a molecular weight of 1,500–1,800 and having 10 percent polyoxyethylene in the total molecule.
[4] $I_{sp}$ was 243 when corrected for heat loss.

| | Weight percent |
|---|---|
| Pluronic L-61 | 14.36 |
| Castor oil | 3.26 |
| Toluene-2,4-diisocyante | 2.38 |
| Ammonium perchlorate (200 m$\mu$) | 56.00 |
| Ammonium perchlorate (18 m$\mu$) | 24.00 |

The above ingredients were thoroughly mixed under vacuum at room temperature for twenty minutes. One-half of the mixture (Batch B–3) was removed from the mixer, cast into a mold, and cured 96 hours at 160° F. The remaining one-half (Batch A–3) was then heated to 170° F., mixed for an additional 10 minutes under vacuum, cast into a mold, and cured 96 hours at 160° F. Batch A–3 was bubble free, whereas Batch B–3 contained numerous small gas bubbles.

Both batches were tested for physical properties. Results were as follows:

| Batch | Temp., °F. | Maximum stress, p.s.i. | Ultimate stress, p.s.i. | Elongation at maximum stress, percent | Elongation at ultimate stress, percent | Young's modulus, p.s.i. |
|---|---|---|---|---|---|---|
| A–3 | 75 | 61 | 28 | 21.2 | 63.0 | 599 |
| B–3 | 75 | 46 | 25 | 16.3 | 30.3 | 537 |

It is to be noted that bubble-free Batch A–3 is superior in all respects to Batch B–3.

Strands of each batch were prepared and the following burning rate data were obtained according to the Crawford bomb technique. Results were as follows:

| Batch | Burning rate, $r$— | | Burning rate exponent, $n$ |
|---|---|---|---|
| | @ 1,000 p.s.i. | @ 600 p.s.i. | |
| A–3 | 0.225 | 0.173 | 0.11 (300–600 p.s.i.) 0.50 (600–1000 p.s.i.) 0.25 (1,000–1,250 p.s.i.) |
| B–3 | 0.265 | 0.217 | 0.40 (300–1,350 p.s.i.) |

In said burning rate tests the bubble-free Batch A–3 gave well duplicated burning rate points on a smooth line, whereas Batch B–3 containing bubbles did not give good duplication, nor did the points fit a curve smoothly.

EXAMPLE IV

Two other propellant compositions C and D were prepared in accordance with the invention as described in Example I above. Strand specimens of both propellants While certain examples have been set forth above as illustrating the invention, said invention is not to be limited thereto. Various other modifications of the invention will be apparent to those skilled in the art in view of this disclosure. Such modifications are within the spirit and scope of the invention.

I claim:
1. In a method of preparing a castable propellant composition comprising a solid inorganic oxidizing salt dispersed in a liquid curable polyurethane suitable for use as the binder component in said propellant composition, the improvement comprising heating said polyurethane while said salt is being dispersed therein under vacuum to a temperature a few degrees above the curing temperature at which said composition is to be subsequently cured and for a short period of time sufficient to decompose gas forming impurities in said polyurethane but insufficient to obtain appreciable cure of said polyurethane.

2. In a method of preparing a grain of cast solid propellant material comprising mixing an inorganic oxidizing salt as an oxidizer component into a binder component comprising a curable liquid polyurethane suitable for use as said binder component to form a uniformly dispersed mixture and subsequently curing said mixture at an elevated temperature to form said grain, the improvement comprising heating said mixture during said mixing step to a temperature a few degrees above said curing temperature, said heating being carried out for a short period of time sufficient to decompose unstable gas forming impurities in said polyurethane but insufficient to obtain appreciable cure of said polyurethane.

3. A method for preparing a castable propellant composition comprising, in combination, the steps of: blending a solid inorganic oxidizing salt into a curable liquid polyurethane suitable for use as the binder component in said propellant composition, said blending being carried out for a period of time sufficient to form a uniformly dispersed mixture; and during said blending step, heating said mixture to a temperature a few degrees above the curing temperature at which said composition is to be subsequently cured and for a short period of time sufficient to decompose gas forming impurities in said polyurethane but insufficient to obtain appreciable cure of said polyurethane.

4. A method for preparing a casting propellant composition comprising, in combination, the steps of: blending, under vacuum, a solid inorganic oxidizing salt into a curable liquid polyurethane suitable for use as the binder component in said propellant composition, said blending being carried out for a period of time sufficient to form a homogeneous mixture; and during said blending step, heating said mixture to a temperature a few degrees above the temperature at which said composition is to be subsequently cured, said heating being carried out for a short period of time sufficient to decompose unstable gas forming impurities present in said polyurethane but insufficient to obtain appreciable cure of said polyurethane.

5. A method for preparing a grain of cast solid propellant material comprising, in combination, the steps of: blending, under vacuum, a solid inorganic oxidizing salt into a curable liquid polyurethane suitable for use as the binder component in said propellant composition, said blending being carried out for a period of time sufficient to form a uniformly dispersed mixture; during said blending step, heating said mixture to a temperature a few degrees above the curing temperature employed in a subsequent curing step described hereinafter for a short period of time sufficient to decompose unstable gas forming impurities in said polyurethane but insufficient to obtain appreciable cure of said polyurethane; casting said mixture into a mold; vibrating said mold; and curing said mixture in said mold.

6. A method for preparing a grain of cast solid propellant material which comprises, in combination, the steps of: blending together in amounts sufficient to react with each other and form a polyurethane, at least one polyisocyanate and at least one active hydrogen containing compound selected from the group consisting of (1) polyhydroxy compounds, (2) polyamine compounds containing at least one active hydrogen atom, and (3) polyol copolymers of mixed cyclic ethers and a polyhydroxy crosslinking compound, said cyclic ethers having the structural formula:

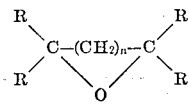

where $n$ is an integer from 0 to 3, and R is a radical selected from the group consisting of hydrogen, alkyl, alkenyl, alkynyl, aromatic, alkaryl, aralkyl, cycloalkyl, alkylcycloalkyl, and halogen substituted groups thereof, the total number of carbon atoms in said compound not exceeding 36, to form a first mixture; blending a solid inorganic oxidizing salt into said first mixture in a second blending step to form a second mixture; during said second blending step, heating said second mixture to a temperature a few degrees above the curing temperature employed in a subsequent curing step described hereinafter and for a short period of time sufficient to decompose gas forming impurities in said polyurethane but insufficient to obtain appreciable cure of said polyurethane; casting said second mixture into a suitable mold; vibrating said mold, and curing said second mixture in said mold at a temperature lower than said first mentioned temperature.

7. A method according to claim 2 wherein said curing temperature is a temperature within the range of 150 to 200° F.; and said mixture heated during said mixing step to a temperature which is from about 5 to about 25° F. above said curing temperature for a period of time within the range of about 5 to about 25 minutes.

8. A method according to claim 6 wherein said polyurethane is formed by interacting castor oil and toluene-2,4-diisocyanate.

9. A method according to claim 6 wherein said polyurethane is formed by interacting (1) a polyoxypropylene-polyoxyethylene copolymer as a first polyhydroxy compound, (2) N,N,N',N'-tetrakis(2-hydroxypropyl) ethylene diamine as a second polyhydroxy compound and crosslinking agent, and (3) toluene-2,4-diisocyanate.

10. A method according to claim 6 wherein said polyurethane is formed by interacting (1) a polyoxypropylene-polyoxyethylene copolymer as a first polyhydroxy compound, (2) castor oil as a second polyhydroxy compound and crosslinking agent, and (3) toluene-2,4-diisocyanate.

11. A method according to claim 6 wherein said second mixture is heated for a period of time within the range of about 5 to about 25 minutes during said second blending step to a temperature which is from about 5 to about 25° F. above said curing temperature employed in said subsequent curing step.

12. A method according to claim 6 wherein said curing temperature is a temperature within the range of 150 to 200° F.; and said second mixture is heated during said second blending step to a temperature which is from about 5 to about 25° F. above said curing temperature for a period of time within the range of about 5 to about 25 minutes.

13. A method according to claim 2 wherein said mixture is heated during said mixing step to a temperature which is from about 5 to about 25° F. above said curing temperature employed in said subsequent curing step and for a period of time within the range of about 5 to about 25 minutes.

14. A method according to claim 5 wherein said mixture is heated during said blending step for a period of time within the range of about 5 to about 25 minutes to a temperature which is from about 5 to about 25° F. above said curing temperature employed in said subsequent curing step.

15. A method according to claim 6 wherein said second mixture is heated during said second blending step to a temperature which is from about 5 to about 25° F. above said curing temperature employed in said subsequent curing step.

16. A method according to claim 2 wherein said mixture is heated during said mixing step to a temperature which is from about 5 to about 25° F. above said curing temperature employed in said subsequent curing step.

17. A method according to claim 5 wherein said mixture is heated during said blending step to a temperature which is from about 5 to about 25° F. above said curing temperature employed in said subsequent curing step.

References Cited

UNITED STATES PATENTS 2,855,372   10/1958   Jenkins et al. _____ 52—0.5 X

OTHER REFERENCES

Zaehringer: "Solid Propellant Rockets," Second Stage, American Rocket Co., Box 1112, Wyandotte, Mich. (1958).

Dombrow: "Polyurethanes," Reinhold Publ. Co., N.Y. (1957), pp. 158–160.

BENJAMIN R. PADGETT, Primary Examiner